2 Sheets—Sheet 1.

O. N. CHASE.
CORN HARVESTER.

No. 40,243. Patented Oct. 13, 1863.

Witnesses.
J. L. English
Munroe Stevens

Inventor.
Otis N Chase

2 Sheets—Sheet 2.

O. N. CHASE.
CORN HARVESTER.

No. 40,243. Patented Oct. 13, 1863.

Witnesses.
J. L. English
Munroe Stevens

Inventor.
Otis N Chase

UNITED STATES PATENT OFFICE.

OTIS N. CHASE, OF BOSTON, MASSACHUSETTS.

IMPROVEMENT IN CORN-HARVESTERS.

Specification forming part of Letters Patent No. 40,243, dated October 13, 1863.

*To all whom it may concern:*

Be it known that I, OTIS N. CHASE, of Boston, in the county of Suffolk and Commonwealth of Massachusetts, have invented a new and Improved Corn-Harvester for Harvesting Corn and other Products; and I do hereby declare that the following is a full, clear, and exact description of the same and its construction and operation, reference being had to the annexed drawings, of which—

Figure 1:
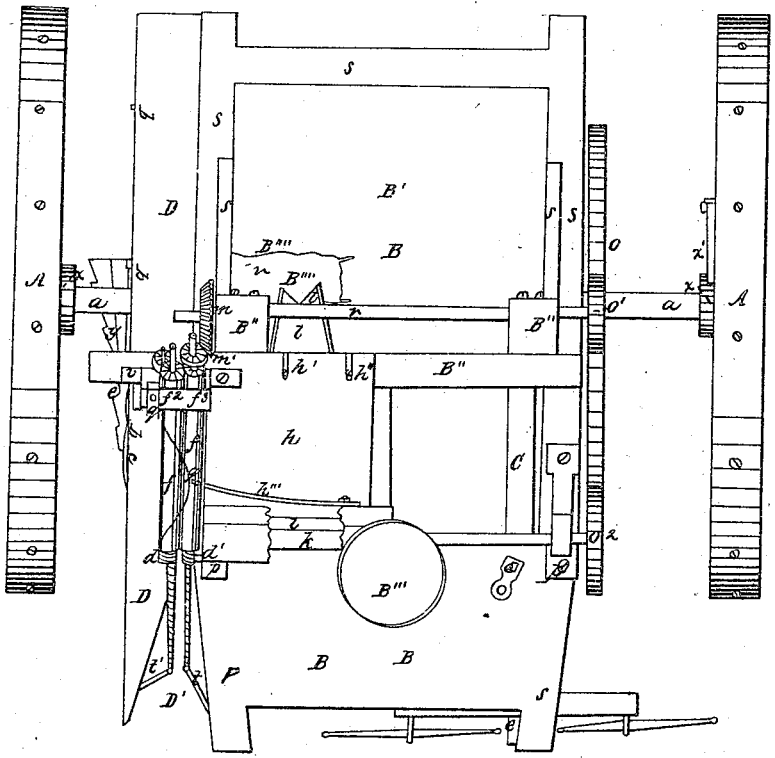
Figure 2:
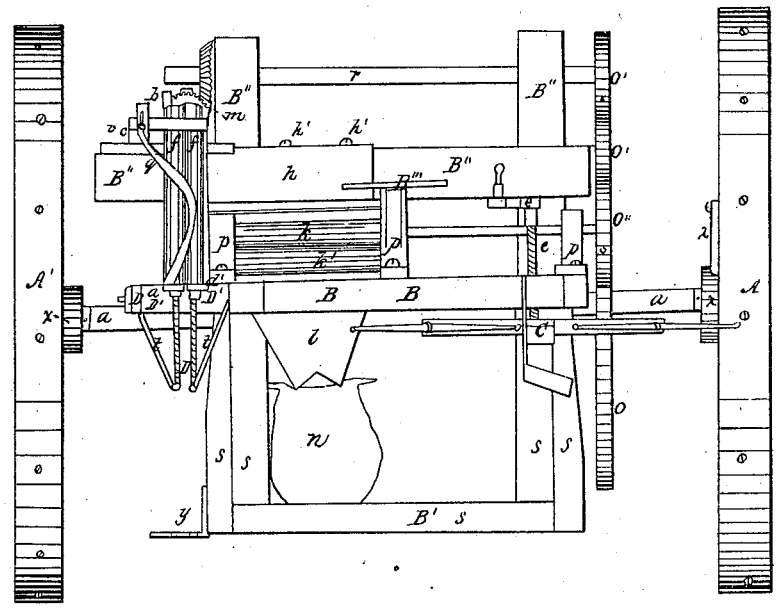
Figure 3:
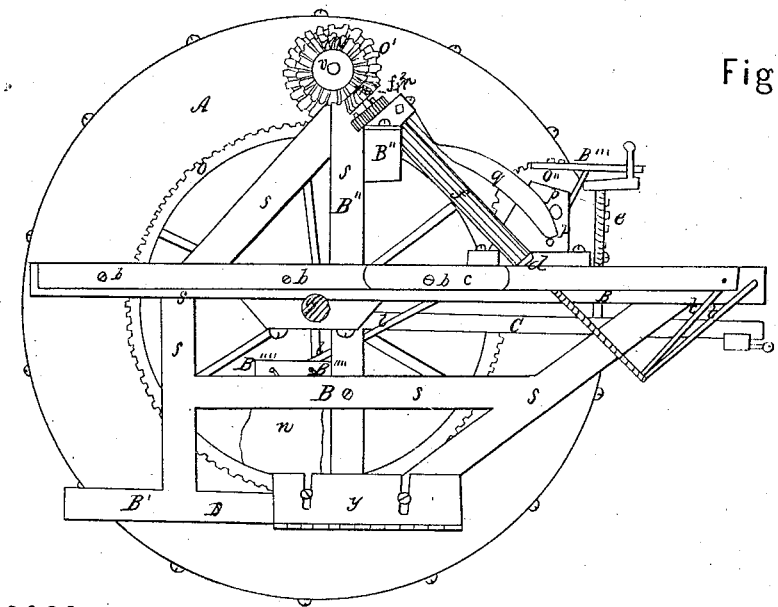
Figure 4:
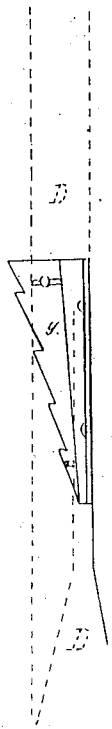

Figure 1 is a top view. Fig. 2 is a front elevation. Fig. 3 is a side elevation with one wheel, A, removed, and Fig. 4 is a detached view of the cutter $y$.

Letters of reference are used.

To enable others skilled in the art to make and use my invention. I will proceed to describe the same and its construction and operation.

The wheels A A have on their outer perimeter projections for insuring rotation while the harvester progresses. The wheels A A and their axle $a$ are connected by the ratchet-wheel and pawl $x\ x'$, so that all rotate together forward, but independently backward.

Supported on the axle $a$ is the frame B, properly braced for strength. The driver's platform B and seat thereon, B''', the attendant's platform B' in the rear, which platform is beneath the level of the axle $a$, either in front or rear of the same, the upright posts and cross-beams B'' B'' B''', and various other beams, $s\ s$, all form parts of said frame. The width of the frame B is designed to be equal to that of the distance between the two rows of corn, and the distance between wheels is such that each would be in the next furrow—one on each side of the two rows of corn. The sides of said frame near the front are beveled inward or narrowed so that the front end of said frame B is of less width than the middle or rear. The axle $a$ turns freely on bearings in said frame B. Below said frame, and connected with it by a hinged joint near the axle $a$, is the beam C, to the front end of which horses or other power is to be attached for drawing the harvester forward. The frame B and beam C are also connected by the screw $e$, so that the driver may by turning such screw elevate or depress at pleasure the front end of said frame B.

The beam C may be otherwise placed and attached to the frame B, and the rollers $ff$ may be otherwise attached to the frame B and elevated and depressed in a different manner. A lever or other device may be substituted instead of screw $e$.

The spring guide-beam D is connected with the frame B by the bolts $b\ b\ b$, and is pressed toward said frame by the spring $c$, so that such beam constantly tends to rest in contact with the frame B. The beam D is (except as follows) a rectangular beam. A triangular portion is removed from the inner side of said beam D at its front end, so that said beam is beveled at its front end, but in a direction opposite to the frame B, so that an orifice or angular space, D', is there left between said frame B and beam D. A portion of said beam D behind said space D' is also removed, so that anything passing between the rollers $ff$, hereinafter described, may fall to the ground through the orifice formed thereby. Another beam, similar to the beam D, with apparatus similar to that hereinafter described, may be applied to the other side of the frame B, so that two rows of corn may be similarly gathered at one and the same time. This arrangement, however, would require a slight change in the location of the gear-wheels $o\ o'\ o''$, as also of the beam C. Toward the apex of said angular space D' are the roller or gatherers $ff$, which consist of two rollers inclined forward, which may be grooved, fluted, or otherwise, the front lower ends of which are so located that as the harvester progresses the standing corn before the space D' will be guided by said beveled sides of said frame B and beam D through said space D', and between the bearings of said rollers $d\ d'$, hereinafter described, between the said rollers $ff$, and will there be caught between said rollers. The rotation of these rollers $ff$ will draw the portions of the corn above said rollers toward the rollers $ff$ in a direction perpendicular to the plane of their axis of rotation. The stalks will be drawn between and below said rollers and fall to the ground through the orifice before named, while the ears of corn, being composed of a harder and more incompressible material, will not pass between said rollers, but will be severed from the stalks and remain above said rollers.

In order to more effectually remove the husks from the ears, a screw-cam and pin or other device may be attached to the upper portion of either or both the rollers $ff$ for the purpose of giving a vibrating motion in the line of their axes to one or both of the rollers $ff$ while they rotate, thus giving a revolving motion to the stalks and ears, and exposing all sides of the unhusked ear at the butt to the action of the rollers $ff$, thereby accomplishing the double object of gathering and husking at one and the same time with the same set of rolls. In order that the stalks may freely fall to the ground after having passed between said rollers $ff$, it is proper that the orifice left for the purpose should be of about equal length with the rollers $ff$. The spring $q$ is above said rollers $ff$, and when not forced away rests against the end of the guide $h'''$ on the inclined plane $h$, so as to form a sort of box, effectually preventing the escape of the severed ears, except as they slide down said guide $h'''$ and inclined plane $h$. The standing corn drawn toward the rollers $ff$, as aforesaid, will, in passing said spring $q$, force said spring one side until the corn is behind the spring, when the spring returns to its former position. The spring $q$ is adjustable by a set-screw near $f^2$. The guide $h'''$ is also secured and adjustable by a set-screw at its end opposite the spring $q$.

The spring $q$ and guide $h'''$ may be used separately, if desirable.

The upper ends of the rollers $ff$ may be made of less diameter than the portions below, so as to permit the extreme tops of the stalks to fall freely between; or a knife may be attached for cutting such tops. The rollers $ff$ turn on bearings in boxes at $f^2 f^3$, attached to the cross-beam $B''$ of the frame B. The outer roller is pressed against the inner roller by a spring at its bearing $f^2$, which spring is regulated by the screw $v$, so as to allow the rollers $ff$ to give when forced apart.

Above the boxes $f^2 f^3$ upon each roller is a small gear-wheel, which each play into a small gear-wheel below, so as to insure rotation even when the rollers $ff$ are pressed apart. The lower end of the inner roller $f$ turns on a bearing or in a box connected with the frame B, while the lower end of the outer roller $f$ turns on a bearing or in a box connected with the beam D, so that an open space is left between said bearings $d d'$. A groove is cut round the lower ends of said rollers at the bearings $d d$, into which a band is inserted, and fastens each of the respective rollers to the frame B and spring guide-beam D. The outer surface of these bands or bearings interposes no obstacle to the passage of the corn, being sunk flush with the surface of the respective bearings. These bands may be used in connection with the rods $t t$, or they may be used separately, if desirable, through which the standing corn passes before it reaches the rollers $ff$, and so that when the rollers $ff$ are forced apart the yielding of the spring $c$ will allow the beam D and outer roller $f$ to yield also. Thus the beam D serves as a guide for the standing corn, as a support for the outer roller, and as a spring for said rollers. The axis of said rollers $ff$ may be extended beyond said bearings $d d'$, and the outer one may turn in a bearing in the rod $t'$, connected with the beam D, and the inner one may turn on a bearing in the rod $t$, connected with the frame B. These rods $t t'$ may also assist in guiding the standing corn.

The wheel $o$ is attached to the axle $a$ as a center, and plays into a pinion on the shaft $r$, which shaft turns on bearings in the upright posts $B'' B''$ of the frame B. At the opposite end of said shaft $r$ is the bevel-gear wheel $m$, which wheel plays into a bevel-gear wheel $m'$, attached to the upper end of the inner roller $f$, so that the rotation of the wheels $A A'$ is communicated through the axle $a$ and shaft $r$ to the rollers $ff$, causing them to rotate in such a manner as shall tend to draw whatever is introduced between them downward.

The incline plane $h$ is attached to the cross-beam $B''$ of the frame B by clamp-screw in the slots $h' h''$. Near the lower end of this plane $h$ are the elastic rollers or huskers $k k'$ for removing the husks from the ears. These rollers are pressed together by springs at the bearings of the lower roller, $k'$.

The husking-rollers $k k$ may be elastic or otherwise.

The inclined plane $h$ is adjustable forward and backward at the slots $h' h''$, so as to increase or diminish the distance between the front lower end of said plane and the lower roller, $k'$, so that a husked ear may fall between said roller $k'$ and inclined plane $h$ upon the inclined plane $l$. In order to facilitate the severed ears falling on the plane $h$, the outer roller $f$ may be a little elevated above the inner roller $f$. The said plane $h$ is so arranged that the corn, being severed as aforesaid, will slide down said plane and guide $h''$, and the husks thereof will be caught between and drawn between said rollers $k k'$, and will be forcibly torn from the ears, while the ears will fall upon said inclined plane $l$.

The rollers $k k'$ are protected from the weather above and behind by a covering, which covering also serves as a support for the guide $h'''$, and is adjustable backward and forward, so as to adjust the guide $h'''$ higher or lower on the inclined plane $h$. Beneath said huskers $k k'$ and inclined plane $h$ is the inclined plane $l$, which serves to guide the husked ears of corn into the bag or receptacle at $n$. This receptacle may be supported on the rods $B'''' B''''$.

The platform is for the attendant, who supplies empty receptacles as he removes those filled with the husked corn. The axis of the upper roller, $k$, is extended, and the gear-wheel $o''$ is thereupon, into which the gear-wheel $o$ plays, so as to cause the rotation of the rollers $k k'$ while the harvester progresses. The rollers $k k'$ may be placed parallel or otherwise as respects the rollers $ff$. The cutter $y$ is for cutting the stalks after or while the corn is being gathered. This cutter is attached to the frame by screws in slots, so that such cutter may be elevated or depressed, and its knife turns on a pivot near its front, and may be clamped at its rear, so that it may cut at a proper angle and also a proper width.

The operation of the machine is as follows: Horses or other power is connected with the beam C. The cutter $y$ is set and clamped so as to cut at the proper height and width. The driver mounts his platform B and by means of the screw $e$ adjusts the fore end of the frame B so that the rollers $f\,f$ shall sever the ears at the proper height. The attendant mounts the platform B' and places a bag, $n$, or other receptacle under the lower end of the plane $l$. The harvester is then drawn along a corn-row or corn-rows so that the standing corn, as the harvester progresses, shall come within the space D'. The corn is guided by the sides of said space between and beyond the bearings $d\,d'$ and between the rollers $f\,f$. One rotation of the wheels A A forward causes the rollers $f\,f$ and the rollers $k\,k'$ to rotate, as before stated. The standing corn will be drawn between said rollers, will force the spring $q$ aside, and the ungathered ears will pass above and behind such spring. The ears having so passed, the spring $q$ will return. The stalks will be drawn between said rollers $f\,f$, while the ears will remain above, as described, and will fall upon and slide down the inclined plane $h$ and guide $h'''$. Near the lower end of said plane $h$ the husks will be caught and torn off by said rollers $k\,k'$, while the husked ears will fall between said plane $h$ and roller $k'$ upon and down the inclined plane $l$ into the receptacle at $n$. As one receptacle is filled it is removed and another one supplied by the attendant. The cutter severs the stalks near the ground as they pass beneath the rollers $f\,f$. As the wheels A A' turn backward independently, the harvester is easily turned. The standing corn is introduced by suitable means between rollers, as at $f\,f$. The rotation of these rollers will draw the stalks between, but the greater incompressibility of the ears will prevent their passing between such rollers. Such rollers may be of different forms from those described, may be mounted on differently planned and constructed frames or vehicles, or may have the material to be harvested introduced differently, yet the mode of separating the ears from the stalks will be substantially as described. For introducing the standing corn between the rollers $f\,f$ a space is left between the bearing or boxes of the rollers $f\,f$ at $d\,d'$, so that there shall be no obstruction to the progress of the standing corn between the rollers $f\,f$.

The rollers $f\,f$ may be used separate from the rollers $k\,k$, if desirable.

What I claim, and desire to secure by Letters Patent, is—

1. The frame B of the harvester, provided with the driver's platform B in the front and the attendant's platform B' in the rear, and with the gathering-rollers $f\,f$ and the conduit $l$ to conduct the harvested material into receptacles near said platform B', substantially as described, and for the purposes set forth.

2. The spring guide-beam D or its equivalent, in combination with the inclined rollers $f\,f$, substantially as described.

3. The combination of the spring $q$ or its equivalent with rollers $f\,f$ and beam D, substantially as described.

4. The cutter $y$, attached to the frame B, in combination with the rollers $f\,f$, substantially as described, for the purposes specified.

OTIS N. CHASE.

Witnesses:
J. L. ENGLISH,
MUNROE STEVENS.